Sept. 29, 1970  R. S. STERNASTY  3,531,316
ANTI-BLOCKING OVERCOATING COMPOSITION FOR ADHESIVES
Filed Nov. 7, 1966
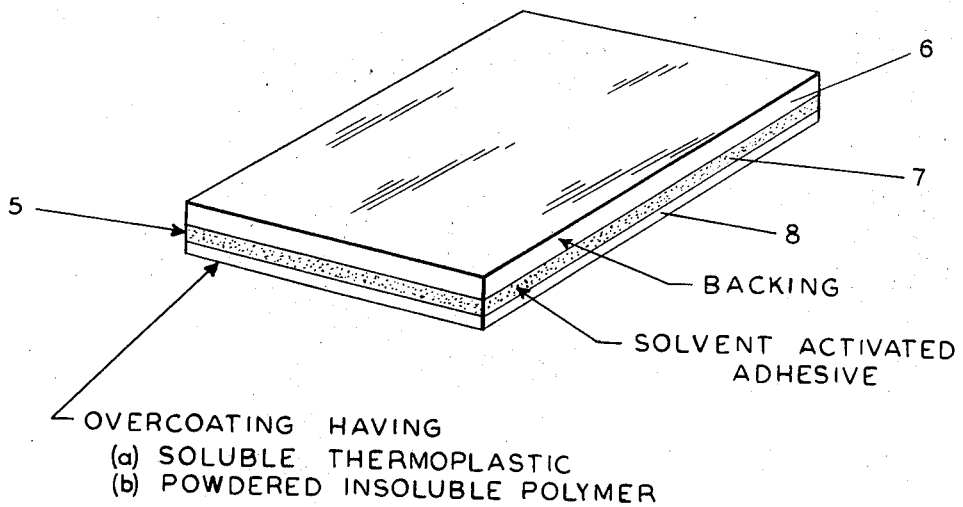
INVENTOR
RICHARD S. STERNASTY
BY
ATTORNEY United States Patent Office 3,531,316
Patented Sept. 29, 1970

3,531,316
ANTI-BLOCKING OVERCOATING COMPOSITION FOR ADHESIVES
Richard S. Sternasty, Milwaukee, Wis., assignor to W. H. Brady Co., Milwaukee, Wis., a corporation of Wisconsin
Filed Nov. 7, 1966, Ser. No. 592,351
Int. Cl. C09j 7/04; B44d 1/14
U.S. Cl. 117—76
3 Claims

ABSTRACT OF THE DISCLOSURE

Adhesive articles having adhesive that is activatable with an organic solvent system and which include, over the adhesive, an anti-block coating comprising (1) a thermoplastic film-former that is soluble in the solvent system which activates the adhesive, and (2) a powdered ingredient that is insoluble in said solvent system.

BACKGROUND OF THE INVENTION

This invention relates to adhesive articles such as labels, tapes, markers, etc. which have a layer of solvent activated adhesive. Specifically, this invention provides an anti-block overcoating or top-coating for a layer of solvent activated adhesive to render the same non-blocking, thereby eliminating the need for using a protective liner or covering material over the adhesive and, at the same time, enabling the adhesive to be readily activated when it is desired to apply the adhesive article to an object. The overcoating of this invention may also be used with pressure sensitive adhesives.

THE PROBLEM

The term solvent activated adhesive as used herein refers to an adhesive mass which is activated upon the application of a suitable organic solvent, and such term is meant to exclude water activated and heat activated adhesives. When in their unactivated state before the solvent is applied, layers of solvent activated adhesive still exhibit a tacky character so that it is possible for a stack of adhesive articles each having an exposed adhesive surface to become adhered to one another during storage, for example. One solution of this problem is to cover the exposed solvent activated adhesive layer with a non-adhesive liner such as a paper coated or impregnated with a release coating. Two other solutions for rendering a solvent activated adhesive layer non-tacky during storage or non-use conditions include compounding the adhesive with a non-tacky sythetic resin or compounding the adhesive with a low tack rubber combined with low tack resins and inert fillers. The first of these solutions, the use of the non-tacky synthetic resin in the adhesive, however, is not desirable because the adhesive does not exhibit as good internal strength after solvent activation and application as it would without such resins. The second method has the undesirable feature of not remaining non-tacky when slightly elevated temperatures and/or pressures are encountered during storage. Thus the three prior art solutions to the problem of combating the tackiness of solvent activated adhesive layers until it is desired to activate the adhesive all have undesirable characteristics.

THIS INVENTION

My present invention now provides a new solution to combating the tackiness of solvent activated adhesive layers through the discovery that they can be made non-blocking by covering the adhesive mass or layer with a composition including a solvent soluble thermoplastic resin of the type normally used for injection molding or extrusion molding and an insoluble plastic powder, whereby the adhesive is rendered non-tacky under all usual conditions of temperature and pressure normally encountered during storage. Upon the application of a suitable solvent, the solvent penetrates the anti-blocking coating and activates the adhesive so that it becomes tacky and closely resembles the adhesive characteristics of the same solvent activated adhesive without the overcoating. The powdered component of the overcoating composition not only aids in imparting anti-block properties but seems to improve the activation properties of the adhesive by controlling the rate of activation and also provides slip or abhesive properties which can be desirable in handling and dispensing the adhesive articles.

A clear conception of the present invention will be had from the ensuing description. Many suitable compounds for use as ingredients in the overcoating are disclosed and, although a number of presently-preferred modes for the practice of this invention are set forth, it is expected that those skilled in the adhesive compounding art will be able to make changes or departures from this disclosure and still remain within the scope of this invention. Therefore, the present description is to be considered as illustrating this invention but not as being a limitation of its technological scope.

FIG. 1 is a schematic representation of an adhesive article in accordance with this invention.

As illustrated in FIG. 1, an adhesive article 5 in accordance with this invention may include a backing 6 having a layer 7 of solvent activated adhesive applied to one of its surfaces with an overcoating 8 applied over the exposed surface of the adhesive layer 7. The adhesive article 5 may be a label, tape, nameplate, etc. The backing 6 may be, for example, a film of plastic, paper, cloth, metal or other suitable material, and can be flexible or rigid. Also, the backing may comprise one or several layers of the same or dissimilar materials, e.g. it can be a film or metal sheet having a coating.

The solvent activated adhesive layer 7 may comprise any type of such adhesive and, as used in this description and in the claims, the term solvent activated adhesive is defined as one which becomes adhesively tacky upon the application of an organic solvent. In the unactivated state, such adhesives are relatively hard as compared to a pressure sensitive adhesive which is normally adhesively tacky, but they also exhibit sufficient tackiness to cause blocking. Blocking is undesired adhesion between stacked (or rolled) articles and can range from a slight degree of adhesion between adhesive articles (particularly lightweight metal nameplates) that can cause distortion or creases upon separation of the articles and interfere with automatic dispensing, to a high degree of blocking in which a stack of labels or nameplates can become a solid block due to adjacent articles becoming inseparably adhered to each other. The solvent activated adhesive composition will normally include a rubbery polymeric material compounded with a suitable compatible tackifier in a solvent. After the solution is applied, the adhesives dry to a relatively hardened condition upon evaporation of the solvent. Commonly used tackifiers are either heat-reactive or non-reactive phenol-aldehyde resins, rosin and its chemically modified derivatives, and polyterpene resins, and natural rubber or synthetic elastomeric materials may be used as the basic film-former. Other ingredients such as pigments, fillers, and anti-oxidants can be incorporated in the adhesive mass. Many suitable formulas for solvent activated adhesives are known and in common use.

In accordance with this invention, the overcoating 8 covering the exposed surface of the adhesive layer 7 includes a combination of two types of ingredients: (1) a soluble thermoplastic resin and (2) an insoluble plastic powder, said components exhibiting their relative solubility properties in a solvent or solvent system that will activate the adhesive and in the solvent system from which the overcoating is cast or applied over the adhesive. Materials suitable for the first component, the solvent soluble thermoplastic resin, include polyepoxide resins, polycarbonate resins such as those prepared from bisphenol A and phosgene, cellulose acetate, cellulose acetate-butyrate, vinyl chloride homopolymers and copolymers containing a major portion of vinyl chloride, vinyl fluoride polymers, polymethyl methacrylate, and polystyrene, or a mixture of two or more of the foregoing resins. Commercial designations of suitable materials are the Phenoxy 8 polyepoxy resin made by Union Carbide and Eponol 55-40 made by Shell Chemical Co., Lexan 125, the polycarbonate available from General Electric Company, Plexiglas V-100 polymethyl methacrylate, and VYHH and VYNS vinylchloride resins made by Union Carbide. Examples of the insoluble plastic powder ingredient of the overcoating which have been found useful include powdered polyethylene, powdered polypropylene, powdered polyvinylidene fluoride, powdered nylon, powdered polytetrafluoroethylene (TFE), powdered fluorinated ethylenepropylene copolymer (FEP), and powdered polychlorotrifluoroethylene (CTFE), or a mixture of two or more of the foregoing insoluble powders. Examples of these materials commercially available include Microthene M-620, a powdered polyethylene; Kynar 301, polyvinylidene fluoride powder; Teflon FEP and Teflon TFE, and Zytel 101 nylon powder.

The following examples will further illustrate this invention. In the various formulae, the term "parts" means parts by weight unless otherwise noted.

EXAMPLE 1

An adhesive article as shown in FIG. 1 was prepared having the following construction:

Backing 6—3 mil thick aluminum
Solvent activated adhesive 7—100 parts neoprene AC soft; 45 parts heat reactive oil soluble phenol-aldehyde resin (Bakelite CKR-1634); 4 parts MgO; 5 parts ZnO; 1 part anti-oxidant (Neozone A)
Overcoating 8—25 parts polyepoxide resin (Phenoxy 8) as the soluble component; 40 parts powdered polyethylene (Microthene M-620) as the insoluble component.

The overcoating was prepared by dissolving the 25 parts of the polyepoxide resin of the overcoating in 50 parts methyl ethyl ketone and 25 parts toluene, adding the 40 parts of powdered polyethylene, and then adding another 15 parts of methyl ethyl ketone to obtain suitable coating viscosity. This composition was coated onto a temporary carrier comprising a sheet of polyethylene coated kraft paper and dried. The adhesive layer 7 was mixed with 350 parts toluene, applied over the overcoating layer, and dried. Next, the aluminum backing was laminated to the adhesive layer with pressure and slightly elevated temperature. Upon completion of the lamination, the polyethylene coated kraft paper was removed to yield the completed adhesive article. In the final article, the powdered polyethylene remained dispersed throughout the overcoating as discrete particles.

The adhesive article was tested for its blocking properties by placing two of the adhesive articles with the coated surface of one contacting a coated surface of the second (i.e. the overcoating 8 of one article contacted the overcoating 8 of the other) for 72 hours in an oven heated to 120° F. under 1 p.s.i. pressure; there was no evidence of any blocking between the two samples. Under these same conditions, adhesive articles coated only with the solvent activated adhesive layer but not including the overcoating layer would adhere to each other when their adhesive layers were in contact with each other. It was therefore concluded the adhesive article of this invention was non-blocking.

EXAMPLE 2

Using the procedure of Example 1, an adhesive article was prepared as follows:

Backing 6—3 mil aluminum
Solvent activated adhesive 7—60 parts butadiene acrylonitrile elastomer, 50 parts of heat curable phenol-aldehyde resin (CKR-1634); 40 parts of an oil soluble heat curable phenolic resin (SP-103); 14 parts chlorinated rubber; 14 parts Vinsol resin as an extender and tackifier; 450 parts methyl ethyl ketone was the solvent for application.
Overcoating 8—10 parts polycarbonate resin prepared from bisphenol A and phosgene (Lexan 125); 15 parts powdered nylon; this was mixed by first dissolving the polycarbonate in 20 parts methylene chloride and 70 parts 1,1,1-trichloroethylene and then adding the powdered nylon along with 40 parts of 1,1,1-trichloroethylene to get the proper coating viscosity.

The dried completed articles, in which the powdered nylon was dispersed throughout the overcoating as discrete particles, was tested for blocking according to the procedure of Example 1 and were found to exhibit no blocking.

EXAMPLE 3

Adhesive articles were made using the backing of Example 1 and the solvent-activated adhesive layers of Examples 1 and 2, and an overcoat 8 of the following composition: 10 parts of the polycarbonate used in Example 2 dissolved in 70 parts methylene chloride and 35 parts 1,1,1-trichloroethylene, with 40 parts powdered polyvinylidene fluoride (Kynar 301) dispersed therein. The dried articles showed no blocking when tested as in Example 1, with the powdered polyvinylidene fluoride present as discrete particles in the overcoating.

EXAMPLE 4

Again using the backing and solvent activated adhesive layer as in Example 1, an overcoating 8 consisting of 25 parts polymethyl methacrylate and 40 parts of dispersed powdered polyethylene as used in Example 1 was applied over the solvent activated adhesive. The overcoating was compounded by first mixing the polymethyl methacrylate (Plexiglas V-100) with 75 parts methyl ethyl ketone until the resin was dissolved, and then adding the 40 parts powdered polyethylene along with 15 more parts of methyl ethyl ketone to achieve proper coating viscosity. When tested for blocking by the procedure set forth in Example 1, the adhesive articles exhibited no tendency to adhere to one another.

EXAMPLE 5

An overcoating 8 consisting of 25 parts vinyl fluoride polymer (Exon 461) and 25 parts of dispersed powdered polyethylene was formed over adhesive particles incorporating a backing and the solvent activated adhesive of Example 2. The overcoating was applied from 125 parts methyl ethyl ketone, 75 of which were added with the vinyl fluoride polymer to dissolve the same and 50 parts of which were added along with the powdered polyethylene to achieve suitable coating viscosity. In the dried articles, the powdered polyethylene was dispersed throughout the overcoating as discrete particles. Again, when tested by the procedure in Example 1, the adhesive articles exhibited no tendency to block.

EXAMPLE 6

An overcoating composition was prepared by dissolving 25 parts cellulose acetate-butyrate in 75 parts methyl ethyl ketone, and then adding 40 parts of the powdered polyethylene used in Example 1 along with 15 parts methyl ethyl ketone to achieve a coatable viscosity. Adhesive articles were prepared using the backings of the preceding examples and with the neoprene-type solvent activated adhesive of Example 1. In the dried articles, the powdered polyethylene was dispersed throughout the overcoating as discrete particles. No tendency to blocking was noted when tested as set forth in Example 1.

EXAMPLE 7

Adhesive articles were prepared using the aluminum backing as in the preceding examples and the solvent activated adhesive of Example 1. The overcoating consisted of 20 parts VYHH vinyl chloride/vinyl acetate copolymer and 20 parts of the powdered polyethylene used in some previous examples. The overcoating was applied by dissolving the vinyl chloride/vinyl acetate copolymer in 80 parts methyl ethyl ketone and then dispersing therein the 20 parts of powdered polyethylene. The articles exhibited no blocking when tested according to the procedure set forth in Example 1.

EXAMPLE 8

An overcoating composition was mixed by dissolving 5 parts polycarbonate resin (Lexan 125) in 35 parts of methylene chloride, dissolving 5 parts polystyrene in another 35 parts of methylene chloride, and thereafter combining the two solutions and mixing them until a homogenous mixture was achieved. 15 parts of powdered polyethylene and 10 parts of polyvinylidene fluoride were added to the solution, which was then stirred until a uniform dispersion was obtained. Finally, 20 parts of 1,1,1-trichloroethylene was added to obtain a suitable coating viscosity. The overcoating was applied to the adhesive layer of an adhesive article which was a pressure sensitive adhesive consisting of 100 parts of non-curing styrene butadiene rubber (Kraton D-101) and 30 parts polyterpene resin in 450 parts petroleum ether. The dried articles exhibited no blocking when tested as in the preceeding examples. A suitable activating solvent system was a 1:1 mixture of methyl ethyl ketone and toluene.

While the adhesive articles of the above examples were prepared by a transfer method in which the dried overcoating was first formed on a temporary carrier, the solvent activated adhesive layer was applied over the overcoating, the backing was laminated to the adhesive, and the carrier was then removed to yield the final article, other manufacturing processes or procedures are suitable to produce the adhesive articles of this invention. As mentioned previously, other backing materials, coated or uncoated or single-layer or multiple-layer, can be used besides the aluminum shown in the examples.

When it is desired to apply an adhesive article of this invention to an object, a solvent system is used that will first penetrate the overcoating and then activate the solvent activated adhesive to render the same tacky. The solvent system can be applied to the overcoating layer by wiping, using a roller or brush, dipping the article in a suitable solvent, or any other suitable mode. When the solvent system is applied, it penetrates the overcoating layer and may dissolve or remove some of the soluble resin component but substantially all of the insoluble resin component of the overcoating layer remains in place. When the solvent then reaches the adhesive layer, it activates the same and the softened, tacky adhesive pushes or migrates through the overcoating layer so that the adhesive can be adhered to an object. Although the presence of the soluble resin in the overcoating layer impairs somewhat the adhesiveness of the solvent activated adhesive layer, it does not destroy its adhesive character nor impair it to such a degree as to hinder obtaining a strong adhesive bond.

As indicated above, the choice of the organic solvent system for use with the adhesive articles depends on two features, first the type of solvent needed to dissolve the soluble resin component of the overcoating and, second, the type of solvent needed to soften the solvent activated adhesive layer and render it adhesively tacky. The solvent may be a single solvent or a combination of two or more solvents and the term "solvent system" as used herein and in the claims is meant to cover both cases.

Where a polycarbonate resin is used for the soluble component of the overcoating, a chlorinated solvent should be used; with the soluble polyepoxide resin, a ketone or aromatic solvent can be used; with the soluble cellulose acetate or cellulose acetatebutyrate, a ketone solvent; with soluble vinyl chloride and fluoride homopolymers and copolymers, a ketone solvent; and with the polymethyl methacrylate soluble component, chlorinated solvents or ketones may be used. Examples of suitable chlorinated solvents include methylene chloride, methyl chloroform, trichloroethylene and perchloroethylene. Typical useful ketone solvents include methyl ethyl ketone, acetone, methyl isobutyl ketone, and cyclohexanone. Useful aromatic solvents include toluene, xylene, and benzene. With reference to Examples 1–8, a 1:1 by weight mixture of methyl ethyl ketone and toluene can be used to penetrate the overcoatings and activate the adhesives shown in Examples 1, 6, 7 and 8; 1,1,1-trichloroethylene can be used to activate the articles as shown in Examples 2, 3 and 4; methyl ethyl ketone is also suitable to activate the articles of Example 4; and the articles of Example 5 can be activated with methyl ethyl ketone, toluene, and most chlorinated solvents.

In order to provide the overcoating characteristics desired for this invention, it has been found that the overcoating should contain from about, on a weight basis, 20%–50% of the soluble resin component and from about 50%–80% of the powdered insoluble component. It is expected, however, that percentages just outside of these ranges for either ingredient will also be operable and the foregoing are deemed to be the preferred ranges as of the present time. The soluble resin component is the film-forming ingedient and should be present in an amount sufficient to form a continuous film, and there should be an effective anti-blocking quantity of the insoluble component dispersed throughout such film or coating but not an excessive amount that would prevent solvent penetration. Experience to date has shown that satisfactory results are obtained when the overcoating is about 0.5 mil thick (the term "about" as used herein meaning ±0.2 mil) or, on a weight basis, about 8 pounds of dried coating per 3,000 square feet of adhesive surface.

While this invention has been described primarily with respect to applying the overcoatings to solvent activated adhesive layers, the overcoating compositions of this invention can also be applied over layers of pressure sensitive adhesive, as in Example 8 above. However, they have lesser utility with the pressure sensitive adhesives than with the solvent activated adhesives. Pressure sensitive refers to normally tacky adhesives which can be adhered to an object upon the application of pressure at normal room temperatures and do not require the addition of an organic solvent in order to become adhesively tacky, but when covered with an overcoating of this invention solvent must be applied to penetrate the overcoating and render the pressure sensitive layer tacky. Typical suitable pressure sensitive adhesives include a rubbery film-forming material such as natural rubber, synthetic rubber, latex and rubbery synthetic polymers and copolymers, etc., compounded with a compatible tackifier such as ester gum, wood rosin, terpene resins, etc., and dispersed in an aliphatic or aromatic solvent. Other ingredients such as anti-oxidants, pigments, fillers, etc., can be incorporated in the adhesive mass.

There has thus been described an anti-blocking overcoating composition for application over a layer or mass of solvent activated adhesive or pressure sensitive adhesives if so desired, to render the adhesive layer non-blocking. Adhesive articles such as tapes, labels, markers, etc. when incorporating the construction of this invention, can be stacked or rolled and stored for extended periods even at elevated temperatures and pressures without adhering to one another. The anti-blocking overcoating compositions of this invention do not impair the effectiveness of the solvent activated adhesives in obtaining a strong adhesive bond after the adhesive is activated and the article affixed to an object. When using the overcoating of this invention, there is no need to apply a protective liner to a solvent activated adhesive in order to prevent the same from blocking or adhering to an adjacent article or object, nor is it necessary to compound the adhesive with a non-tacky synthetic resin or compound it with low tack rubber combined with low tack resins and fillers. The elimination of the liner is an advantage and also the ability to provide non-blocking without resorting to compounding the adhesive with low tacky or non-tacky materials are important advantages of this invention since adhesive articles can be provided in which the adhesive mass has good internal strength and the articles can be stored at a range of temperatures and pressures. It has been further noted that the overcoating compositions of this invention have excellent slip properties, which may be helpful in dispensing the adhesive articles.

It is to be understood that it is intended to cover all changes or modifications of the illustrative examples herein disclosed which do not constitute a departure from the spirit and scope of this invention.

I claim:
1. An adhesive article comprising, in combination:
   (1) a backing;
   (2) a layer of adhesive on a surface of the backing, which adhesive can be rendered adhesively tacky upon the application of an organic solvent system; and
   (3) an anti-blocking overcoating covering the layer of adhesive, said overcoating including
      (a) a first ingredient comprising a thermoplastic resin film-former that is soluble in said organic solvent system, which first ingredient is a polyepoxide resin, polycarbonate resin, cellulose acetate, cellulose acetatebutyrate, vinyl choride homopolymer or copolymer, vinyl fluoride polymer, polymethyl methacrylate resin, polystyrene, or mixture thereof; and
      (b) a second ingredient that is insoluble in the said organic solvent system, which second ingredient is powdered polyethylene, powdered polypropylene, powdered polyvinylidene fluoride, powdered nylon, powdered polytetrafluoroethylene, powdered fluorinated ethylene-propylene copolymer, powdered chlorotrifluoroethylene polymer, or mixtures thereof.

said overcoating containing, on a dried weight basis, from about 20% to 50% of the first ingredient and from about 50% to 80% of the second ingredient, said second ingredient being present as discrete solid particles dispersed throughout the overcoating, and the adhesive being rendered tacky upon application of said organic solvent system to dissolve or remove said first ingredient film-former between the discrete particles of the second ingredient.

2. An adhesive article according to claim 1 wherein the adhesive is solvent activated adhesive.

3. An adhesive article according to claim 1 wherein the adhesive is pressure sensitive adhesive.

References Cited
UNITED STATES PATENTS

| | | | |
|---|---|---|---|
| 2,027,435 | 1/1936 | Kallander et al. | 117—122 X |
| 2,310,292 | 2/1943 | Humphner | 117—122 X |
| 2,833,671 | 5/1958 | Funk et al. | 117—76 |
| 2,655,463 | 10/1953 | Sandberg | 117—36.1 |
| 3,051,670 | 8/1962 | Grantham | 260—17 |
| 3,055,852 | 9/1962 | Youse | 260—17 |

WILLIAM D. MARTIN, Primary Examiner

B. D. PIANALTO, Assistant Examiner

U.S. Cl. X.R.

117—122